Feb. 12, 1952     H. R. ELLIOTT     2,585,098
GENERAL UTILITY GRIPPING TOOL
Filed Dec. 15, 1947
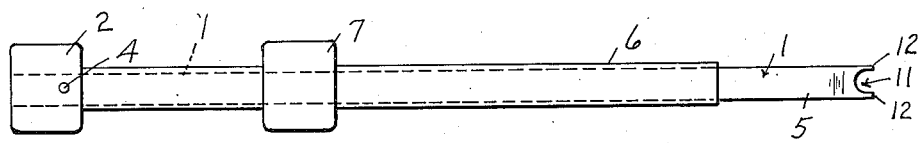
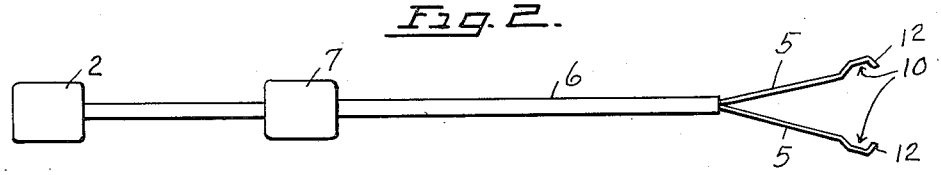
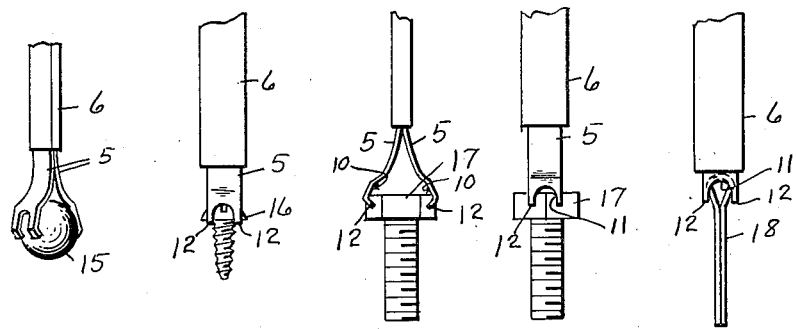
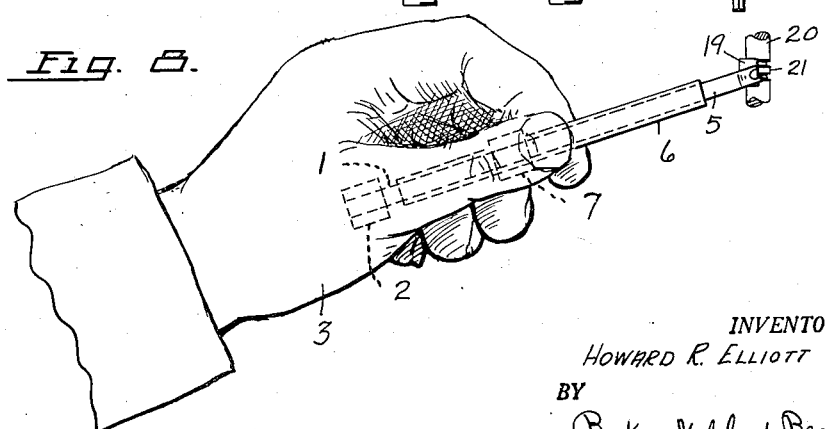
INVENTOR.
HOWARD R. ELLIOTT
BY
Boyken, Mohler & Beckley
ATTORNEYS Patented Feb. 12, 1952

2,585,098

UNITED STATES PATENT OFFICE 2,585,098

GENERAL UTILITY GRIPPING TOOL

Howard R. Elliott, Long Beach, Calif.

Application December 15, 1947, Serial No. 791,768

3 Claims. (Cl. 294—100)

This invention relates to a general utility gripping tool and has for one of its objects the provision of a simple, compact, economically made, easily manipulated tool adapted for gripping and holding a wide variety of objects that heretofore have been picked up and held or positioned with great difficulty, and which tool is adapted to be manipulated by the one hand that carries the same for quickly releasing the object held thereby.

In the repair or fabrication of different articles it frequently happens that ball bearings, screws, cotter pins, nuts, bolts, keepers, sleeves, washers and many other small objects must be placed in localities where it is extremely difficult to properly position them. Many hours are sometimes wasted in attempting to place a small part of a machine or other article in its proper position. Pliers are usually too large or clumsy and either pliers or tweezers require constant pressure to hold the object being placed, and when once in position it is usually dislodged in an attempt to release the grip on the object.

With the present tool, an extremely tight grip is maintained on the object without any effort on the part of the operator once the object has been gripped. The gripping of the object is accomplished with ease and the object can be easily released after it has been positioned without danger of dislodging it. Furthermore, practically any relatively small object can be positively gripped and held irrespective of its contour, which is essential to a gripping tool if it is to qualify as a general utility tool. The present tool can be readily manipulated by one hand of the operator for both the gripping and releasing acts, and the grip is so positive and tight that screws can be driven into work the same as though driven by a screw driver.

Other objects and advantages will appear in the drawings and specification.

In the drawings,

Fig. 1 is an elevational view of the gripping tool as seen from a flat side thereof when the gripping jaws are open.

Fig. 2 is a side edge elevational view of the tool.

Fig. 3 is a fragmentary elevational view of the gripping jaws engaging a ball bearing.

Fig. 4 is a fragmentary elevational view of the jaws gripping the head of a screw.

Fig. 5 is a fragmentary elevational view of the jaws gripping the head of a bolt.

Fig. 6 is a fragmentary elevational view of the jaws gripping a bolt as seen at right angles to the position shown in Fig. 5.

Fig. 7 is a fragmentary elevational view of the jaws gripping the head of a cotter pin.

Fig. 8 is a reduced side elevational view of the tool as held in the hand of an operator when the jaws of the tool are in a position positioning one of the halves of a valve stem keeper on the stem.

In detail the tool comprises a pair of flat spring steel strips 1. These strips 1 are secured together at one of their ends by any suitable means and over the ends so secured together is a knob-like member 2 that is adapted to fit into and against the palm of the hand 3 (Fig. 8) when the device is in use. This member 2 is secured to said strips, as by a pin or rivet 4 (Fig. 1).

The end portions 5 (Fig. 2) of said strips 1 opposite the handle or member 2, extend divergently outwardly, and the length of the strips between said end portions 5 and said member 2 are enclosed within an elongated, flat tubular sleeve 6. This sleeve 6 holds the strips together and is slidable on said strips longitudinally thereof. Thus, when the sleeve 6 is slid toward the spaced divergent ends of the strips 1, the divergent end portions 5 will be moved toward each other.

The means for moving said sleeve 6 toward the divergent ends of the strips 1 comprises an enlarged, relatively thick annular element 7 surrounding sleeve 6 at a point adjacent the member 2 but spaced from the latter, and which element is secured to said sleeve so that movement of the element 7 toward and from the divergent ends of the strips will cause corresponding movement of the sleeve.

The position of element 7 is preferably such that when the member 2 is against the palm of the hand as in Fig. 8, the thumb and forefinger of said hand will be able to grip the element 7 for moving the latter. In this way the sleeve 6 may be quickly slipped toward the divergent ends of the strips 1 for effecting a closing of said ends of the object to be held between said ends by the same hand that holds the tool. Also said fingers may release the tool from the object held between the divergent ends of the strips by moving the sleeve away from the divergent ends of the strips. The other hand is entirely free during the gripping and releasing of an object from the tool by the hand that carries the tool. It is understood that the inherent resiliency of the strips 1 will automatically cause the divergent ends of the strips 1 to separate when the sleeve 6 is moved toward member 2.

It is also important to note that the member 2 and element 7 and the sleeve 6 are all in coaxial alignment and said member 2 and element 7 do not have any projections, loops or other obstacles to easy rotation of the tool in the hand 3 that carries the same. Thus the tool may be rotated by said hand in the same manner and with substantially the same facility as a screwdriver.

The divergent ends of the portions 5 of strips 1 are correspondingly bent along lines extending at right angles to the lengths of said strips to form oppositely opening transverse channels 10 at the ends of said portions 5 (Fig. 2). The end edges of said portions 5 are generally semi-circularly recessed as indicated at 11 in Fig. 1, whereby the outer side of each of said channels 10 will comprise a pair of fingers 12 (Fig. 2). These fingers 12 on the pair of strips are directed generally toward each other and they define the side edges of the respective recesses 11. The base or closed end of each recess extends partially into the base of channel 10. From Fig. 2 it will be seen that the free end edges of the fingers 12 of each strip substantially terminate in the same plane as that in which the portion 5 is disposed. Thus when the portions 5 are brought together by movement of the sleeve 6 to said channels 10, the sides of the channels adjacent the sleeve will function as a stop for the sleeve, and the ends of the fingers 12 will be in substantially meeting relationship.

Referring to Fig. 3 it is seen that by reason of the end recesses 11, a ball bearing 15 of substantial size is easily and firmly grasped between the spaced ends of portions 5, and in this respect the provision of channels 10 is very helpful since a part of the curved surface of the ball will lie within said channels. Of course smaller or larger balls may also be held by the same tool.

In Fig. 4 the head 16 of a screw is held between the ends of the portions 5. The grip adapted to be placed on said head is sufficiently great to enable the operator to drive the screw into wood up to the head without requiring a screw driver. Here again it will be apparent that the recesses 10 and fingers 12 enable the screw head to be firmly grasped and held.

Fig. 5 shows the head 17 of a bolt being grasped by the tool. Obviously a nut or washer can be grasped with equal facility. The provision of the fingers enable rotating the bolt or nut inasmuch as the corners of the head will extend between the fingers 12 (Fig. 6).

Fig. 7 shows the head of a cotter pin 18 being held by the tool, and in Fig. 8 one of the keeper halves 19 is being positioned on a valve stem 20, which job is a particularly difficult one to do in actual practice. A thick grease or the like will hold the keeper to the stem 20 when once in position with the ridge 21 on the stem in a complementary recess in the concave side of the keeper.

The provision of the recess 11 and fingers 12 enable the grasping of a keeper at an angle as seen in Fig. 8 in cases where such angular relationship is essential, although in most jobs the keeper is squarely grasped between the ends of the portions 5 with the fingers extending over the flat sides of the keeper.

It is obvious that the tool may be made in any desired size, although for general utility work substantially the size shown in the drawing, Figs. 1, 2, is satisfactory and preferable.

While manipulation of the sleeve 6 alone by the fingers of the hand will usually cause the ends of the portions 5 to grip the object with sufficient force, additional force may be effected by pressing the portions 5 together at a point near the fingers and with the object between the ends of said portions, and then slipping the sleeve toward said ends to maintain the grip that has been effected. This grip cannot be loosened except by retracting the sleeve. Such retraction is very easy irrespective of the degree of force with which the object is held.

It is to be noted that the entire portion of the tool between the element 7 and the fingers 12 has a maximum cross section equal to that defined by the exterior of sleeve 6 when the sleeve is moved to the sides of the channels 10 that are adjacent the sleeve, and this area is only slightly greater than that of the strips 1. This enables the positioning of certain small objects in places to which access is had through very small openings. When the jaws or portions 5 are expanded to grip an object, the diameter of the object between the points where it is gripped is increased by the thicknesses of the strips 1, and as these are relatively thin, it is apparent that no material increase in dimension is caused.

The arcuate edges of the recesses 11 result in strengthening the fingers and practically eliminates the danger of the metal cracking, as would occur at the bases of the fingers were the recesses rectangular.

It is apparent that the element 7 and member 2 may be of any desired material, and may be circular or oval in outline instead of rectangular. By making them polygonal as indicated in Figs. 1, 2, the tool will not roll as readily on a flat surface. Molded rubber or plastic composition material has been found suitable, the corners being rounded.

I claim:

1. A general utility gripping tool comprising a pair of flat spring strips of the same length arranged in side by side relationship with one of their flat sides in confronting relationship, a knob-like member surrounding one of the corresponding ends of said strips and secured to said ends, the end portions of said strips opposite said member extending divergently outwardly toward the opposite ends of said strip and terminating at said opposite ends in fingers extending generally toward each other, a flat, elongated, tubular element surrounding the said strips between said member and said end portions and slidable on said strips toward said fingers for causing said divergent end portions and said fingers to move toward each other, said member being adapted to fit against the palm of the hand when the thumb and forefinger of said hand are adapted to grasp said element at a point intermediate its ends and adjacent but spaced from said member when the said element is in substantial engagement with said member, and a relatively thick sleeve secured to said element at said point for engagement by said fingers.

2. A general utility gripping tool comprising a pair of flat spring strips of the same length arranged in side by side relationship with one of their flat sides in confronting relationship, a knob-like member surrounding one of the corresponding ends of said strips and secured to said ends, the end portions of said strips opposite said member extending divergently outwardly toward the opposite ends of said strips and terminating at said opposite ends in a pair of fingers spaced transversely of said strips and defining a relatively wide longitudinally extending slot therebetween, said end portions adjacent said fingers being bent to provide opposedly opening channels extending transversely across said end portions with said fingers forming one of the sides of said channels, a flat sleeve extending longitudinally of said strips connecting the latter and supported thereon between said first mentioned ends and said end portions for movement toward said divergent ends for moving said end portions and said pairs of fingers toward each other for gripping an object positioned between said fingers, the corresponding legs of said channels being formed to provide axially directed shoulders for engaging said sleeve for limiting said movement toward said divergent ends.

3. A general utility gripping tool comprising a pair of flat spring strips secured together at one of their ends with their flat sides together and terminating at their opposite ends in divergently extending end portions respectively recessed along the terminating end edges of said divergent end portions to provide a pair of fingers at the end of each strip, the said fingers on said strips extending generally toward each other, a flat sleeve surrounding the central portion of said strips and extending substantially between said first mentioned ends and said end portions and slidably supported on said strips for movement toward said divergent ends for moving said end portions and said fingers toward each other for gripping an object positioned between said fingers.

HOWARD R. ELLIOTT.

REFERENCES CITED

The following references are of record in the file of this patent:

UNITED STATES PATENTS

| Number | Name | Date |
|---|---|---|
| 1,350,123 | Theodore | Aug. 17, 1920 |
| 1,456,913 | Busch | May 29, 1923 |